United States Patent [19]
Gallois-Montbrun

[11] Patent Number: 5,829,427
[45] Date of Patent: Nov. 3, 1998

[54] ORIENTABLE PYRAMID-SHAPED SOLAR COLLECTOR DEVICE

[76] Inventor: Roger Gallois-Montbrun, 11bis, rue de Navarre, 75005 Paris, France

[21] Appl. No.: 786,934

[22] Filed: Jan. 23, 1997

[30] Foreign Application Priority Data

Jan. 24, 1996 [FR] France .................................. 96 00782

[51] Int. Cl.⁶ ...................................................... F24J 2/38
[52] U.S. Cl. .......................... 126/600; 126/684; 126/602; 126/698; 126/581
[58] Field of Search .................................. 126/600, 581, 126/698, 684, 602

[56] References Cited

U.S. PATENT DOCUMENTS

| 4,091,799 | 5/1978 | Steiner | 126/581 |
| 4,509,501 | 4/1985 | Hunter | 126/602 |

FOREIGN PATENT DOCUMENTS 384 839  8/1990  European Pat. Off. .

OTHER PUBLICATIONS

Patent Abstracts of Japan, vol. 9, No. 69 (E–305) Mar. 29, 1985 (JP–A–59–205769, Nov. 1984).

*Primary Examiner*—Larry Jones
*Attorney, Agent, or Firm*—Sughrue, Mion, Zinn, Macpeak & Seas, PLLC

[57] ABSTRACT

Solar collector device constituted by a pyramid-shaped structure comprising three faces 1, 2, 3 or more and a base 4. The face 1, on which various solar energy collecting means are mounted, is the only face used as a planar solar collector, the other faces 2, 3 serving merely to protect the overall device from the wind. The solar collector device is also provided with two different tracking systems: a first system, which operates in azimuth, enabling the pyramid-shaped structure, by a rotation about a vertical axis V, to maintain face 1 in the direction of the sun, and a second system, which operates in elevation, enabling face 1, by a rotation about a horizontal axis H, to keep an inclination normal to the sun's rays.

7 Claims, 3 Drawing Sheets

ORIENTABLE PYRAMID-SHAPED SOLAR COLLECTOR DEVICE

The present invention concerns a tracking photovoltaïc solar collector device whose shape and mechanisms are advantageously combined in order to elimate the drawbacks generally presented by this type of tracking solar collector.

BACKGROUND OF THE INVENTION

Solar collectors are devices on which solar energy collecting means such as photovoltaïc cells are mounted.

Plane solar collectors constituted by a generally rectangular structure on which photovoltaïc modules are mounted, and maneuvered both in azimuth and in elevation by tracking mechanisms, are already known.

Such devices are described, in particular, in patent documents FR-A-2 415 271 and FR-A-2 418 912.

These solar collectors suffer from several drawbacks. For example, it has been observed that such tracking planar solar collectors whithstand wind poorly, even when they are installed in so called "safe position" —a horizontal position or a vertical position with the panel free to swing flag-like— since such positions do not protect them from turbulent wind.

The solar collector device described in Applicant's patent document EP-0 384 839 eliminates these drawbacks.

This tracking device is constituted by two elongated rectangular panels mounted on the front and rear faces of a roof-shaped structure and hinged to a common horizontal axis of rotation coinciding with the structure ridge line. This structure, maneuvered by orientation mechanisms operating in azimuth, rotates about a vertical axis to maintain its front face in the direction of the sun, whereas the plane solar collector built up from the assembled front and rear panels, maneuvered by orientation mechanisms operating in elevation, rotates about a horizontal axis to keep an inclination normal to the sun's ray.

The protection of this plane solar collector from the wind is ensured by a maneuver consisting in folding down the front and rear panels against the corresponding faces of the roof-shaped structure.

If the functional shape of this device withstands wind much better and allows the mounting of powerful tracking solar collectors often required in industrial or commercial programs, it may on the other hand create architectural problems when this device is mounted on houses, and it is to solve such problems that the inventor has set out to find a type of device whose tracking mechanisms would be combined with a shape better adjusted to housing programs traditional architecture.

This objective has been fully achieved with the device of the present invention.

SUMMARY OF THE INVENTION

The solar collector device of the present invention is constituted by a pyramid-shaped structure comprising a pyramid preferably limited to three faces and its support, only one of the pyramid faces, on which various solar energy collecting means are mounted, being used as a plane solar collector, the other faces serving merely to protect the overall device from the wind.

This pyramid-shaped device is preferably provided with two different tracking systems:

The first system, operating in azimuth and which is by far the most efficient, enables the moving assembly constituted by the pyramid and its support, by a rotation about its vertical axis, to maintain the pyramid solar face in the direction of the sun.

The second system, operating in elevation, enables the pyramid solar face, by a rotation about a horizonatl axis, to keep an inclination normal to the sun's rays.

Photovoltaïc solar collectors have been already mounted on fixed pyramid-shaped structures, as well as tracking systems on photovoltaïc solar collectors to increase their electricity production, but never so far had been combined on pyramid-shaped structures the mounting of both photovoltaïc solar collectors and tracking systems, and it is precisely this combination that constitutes the basic idea of the present invention.

Concerning the following description of this new pyramid-shaped device, it is emphasized that the three-faced pyramid preferably adopted in the present study must be considered as a non-liliting example. This type of pyramid has been adopted because of its significant advantages: simpler structure and larger faces allowing consequently the mounting of a larger plane solar collector on the solar face, but it is of course always possible, if necessary, to increase the number of the pyramid faces.

The same remark can be made concerning the types of the tracking mechanisms used in the present study and which are also only given by way of examples.

DETAILED DESCRIPTION

Figure 1:
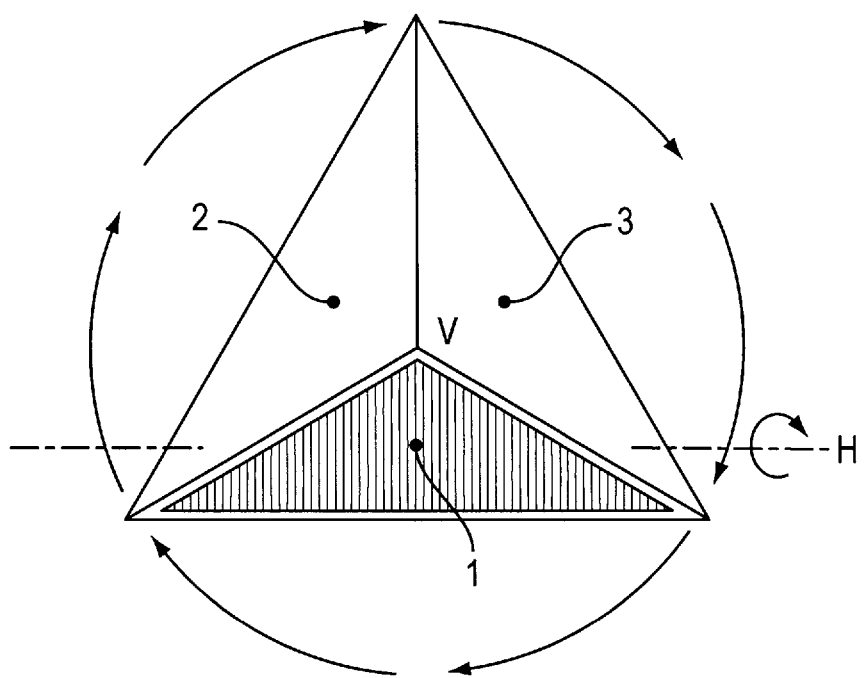
FIG. 1 is a bird's-eye view of a three-faced pyramid according to this invention.

FIG. 1 - This figure shows schematically the device three-faced pyramid, mounted on an advantageously equilateral triangular base (4), with its face (1) used as a planar solar collector and its other two faces (2,3) serving merely to protect the overall device from the wind. Said faces (1,2,3) have been given the advantageous shape of rectangular isosceles triangles, since their 45° base angles allow to mount photovoltaic modules on the solar face (1) more easily.

This figure also shows schematically the two tracking systems which, operating respectively in azimuth and in elevation, enable the pyramid to rotate about its vertical axis (V), and the solar face (1) about a horizontal axis (H).

Figure 2:
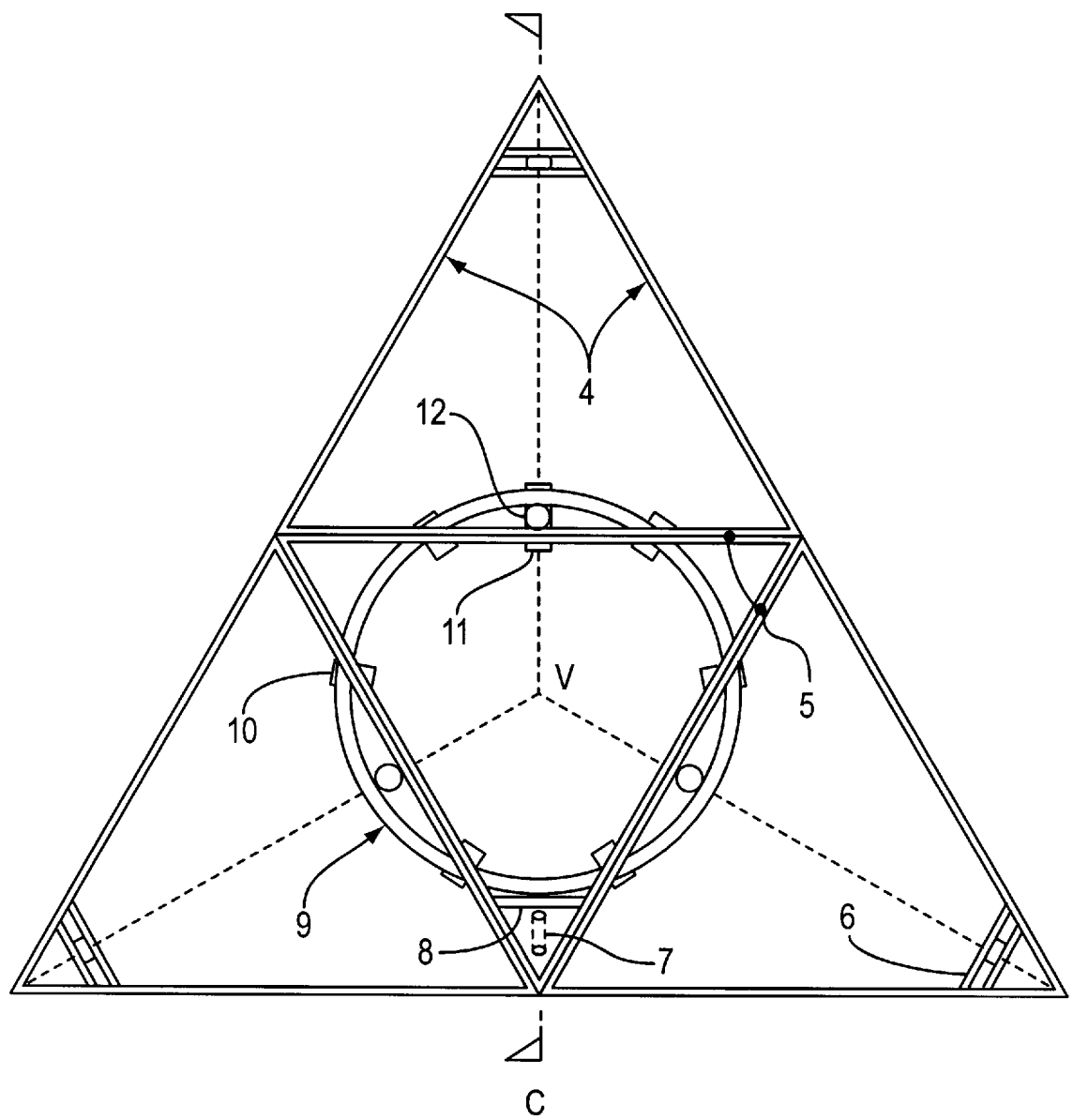
FIG. 2 is a schematic plan view of a device below the pyramid according to the invention whose faces are represented in dashed lines, showing the device orientation mechanisms.
Figure 3:
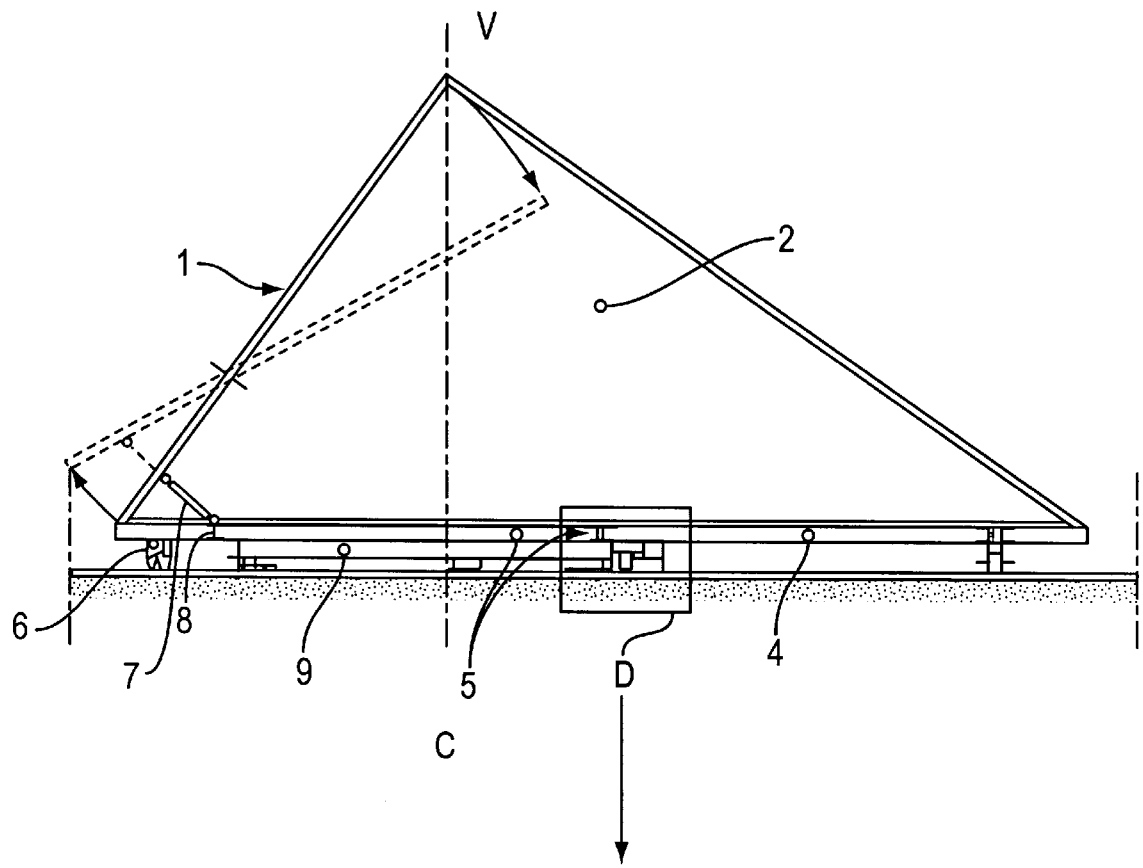
FIG. 3 is a schematic view of the device in a transverse cross section corresponding to vertical plane C of FIG. 2, showing in elevation the moving assembly and fixed parts
Figure 4:
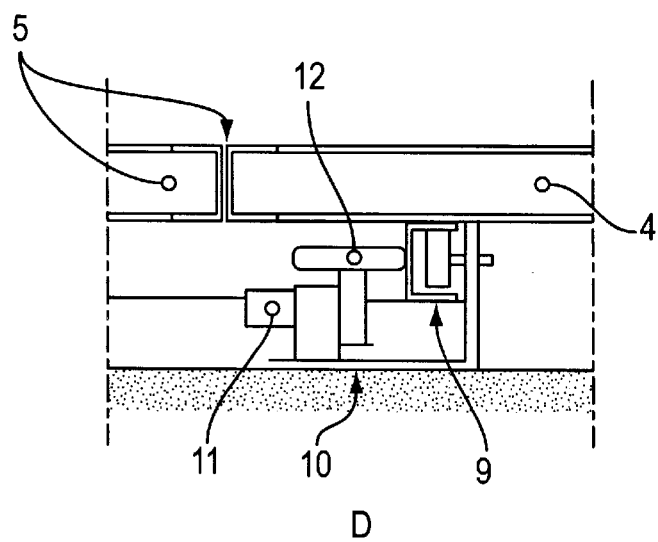
FIG. 4 is an enlarged view of detail D of FIG. 3.

FIGS. 2,3,4 - These figures show schematically, in plan and in elevation, the pyramid base (4) and the device mechanisms ensuring its support and its maneuvers, and which comprise elements belonging to the moving assembly and elements fixed to the platform.

Pyramid base (4)

This structure is preferably constituted by four identical equilateral triangles assembled in the same horizontal plane. This type of assembly presents two advantages:

It first allows to use iron members of the same dimensions, of reduced length, and consequently of reduced cost, easier to carry, to stock and to get mounted.

It also allows to create in the base (4) center a bracing structure (5) whose triangular shape enables said base (4) to have a well balanced stand on the ring (9) to which it is fixed.

Mechanisms belonging to the moving assembly

Ball-bearing wheels (6) advantageously provided on the three pyramid axes and mounted on its base (4) underface. The three wheels are used to reduce, beyond its supporting ring (9), the pyramid cantilevers.

Electric jack (7) for example, hinged at its base to the base (4) longitudinal cross member (8), and at the end of its rod to the pyramid face (1), inclinable and balanced about its horizontal axis of rotation (H), below said axis (H) in order to reduce the maneuver of said jack (7). Thus automatically maneuvered about its horizontal axis of rotation (H) by said jack (7), the pyramid face (1) keeps an inclination normal to the sun's rays, or takes up again the fixed inclination of the pyramid other faces, which happens normally by the end of the day or whenever the strength of the wind, as detected by an appropriate apparatus, may endanger the safety of said face (1) - safety maneuver.

Ring (9) constituted preferably, as shown in FIG. 4, by an U-shaped iron member to which the central triangular bracing structure (5) of the pyramid base (4) can be strongly fixed in six points, as shown in FIG. 2. This ring (9) constitutes the lowest part of the device moving assembly Mechanisms fixed to the platform Angle-shaped devices (10) whose ball-bearing rollers, as shown in FIG. 4, ensure the support and allow the rotation of ring (9).

Electric motor (11) ensuring with its driving wheel, as shown in the same FIG. 4, the rotation of ring (9).

Centering wheels (12) constituting with the motor driving wheel an advantageous triangular mounting, as shown in FIG. 2, ensuring the centering of ring (9)

The description of these drawings proves that the mountings of photovoltaic solar collectors and tracking systems on pyramid-shaped structures are perfectly compatible, and it is on this compatibility that the present invention is based Thanks to this combination of shape and mechanisms, the solar collector device of the present invention presents significant advantages:

Its tracking mechanisms enable the photovoltaic modules to have an electricity production corresponding to their peak power.

Its shape withstand wind well.

It can be mounted without problems on houses, which is quite exceptional for a photovoltaic solar collector device, since it has the shape of a roof well adjusted to their traditional architecture.

I claim:

1. A solar collector devices comprising:

a pyramid-shaped structure having three individual faces (1, 2, 3), and a base (4), a plurality of photovoltaic cells mounted on one of said faces (1) to provide therewith a planar solar collector, said other faces (2,3) serving to protect the device from wind, and, an azimuth tracking system (9, 10, 11, 12) for rotating said pyramid-shaped structure about a vertical axis to maintain said planar solar collector oriented in the direction of the sun.

2. A solar collector device according to claim 1, wherein said azimuth tracking system comprises a ring (9) to which the pyramid-shaped structure base is fixed and which, driven by an electric motor (11), rotates on angle-shaped devices (10) via ball-bearing rollers.

3. A solar collector device according to claim 1, further comprising an elevation tracking system (7, 8) for rotating said planar solar collector about a horizontal axis to maintain an inclination normal to the sun's rays.

4. A solar collector device according to claim 3, wherein said elevation tracking system comprises a jack (7) individually hinged at opposite ends to said pyramid base and said planar solar collector.

5. A solar collector device according to claim 4, wherein said horizontal axis is positioned to balance upper and lower parts of said planar solar collector, and thus make said planar solar collector more easily driven by said jack.

6. A solar collector device according to claim 1, wherein said three faces of the pyramid-shaped structure are rectangular isosceles triangles and said base is an equilateral triangle.

7. A solar collector device according to claim 1, wherein said planar solar collector is non-reflective.

* * * * *